United States Patent Office 2,931,840
Patented Apr. 5, 1960

2,931,840

PROCESS FOR PREPARING 2,3,3,3-TETRAFLUOROPROPENE

David Maley Marquis, Wilmington, Del., assignor to E. I. du Pont de Nemours and Company, Wilmington, Del., a corporation of Delaware No Drawing. Application November 25, 1958
Serial No. 776,184

4 Claims. (Cl. 260—653.3)

This invention is directed to a novel process for the preparation of 2,3,3,3-tetrafluoropropene, $$CF_3-CF=CH_2$$

The process comprises the pyrolysis of a mixture of methyl chloride with tetrafluoroethylene or of methyl chloride with chlorodifluoromethane, the chlorodifluoromethane forming tetrafluoroethylene in situ. This unique fluoroolefin, heretofore not readily obtainable, is a valuable monomer for polymerization and copolymerization reactions.

The prior art discloses two complex routes to the olefin described in the present invention. In the first instance, 2,3,3,3-tetrafluoropropene has been synthesized by a 6-step process starting with glyceryl trichloride involving successive chlorination, dehydrochlorination, and fluorination reactions. The second method reported is a photochemical reaction of trifluoroiodomethane and 2-chloro-1,1-difluoroethylene followed by a combination reduction and dehydrohalogenation reaction. These processes taught by the prior art are indirect and unwieldy.

It is an object of the present invention to provide a novel process for the preparation of 2,3,3,3-tetrafluoropropene. It is a further object of the present invention to prepare 2,3,3,3-tetrafluoropropene by a novel process which results in increased yield and a significantly pure product not heretofore readily attainable. These and other objects will be apparent from the present specification and claims which follow.

More specifically, the present invention is directed to a process for preparing 2,3,3,3-tetrafluoropropene wherein the pyrolysis of a mixture of about 1 mole of methyl chloride with (a) about 1 mole of tetrafluoroethylene or (b) about 2 moles of monochlorodifluoromethane, said monochlorodifluoromethane forming tetrafluoroethylene in situ, is carried out at about 700° C. to about 950° C.

The starting materials for this novel process are halogen-containing organic compounds. Specifically the first member of the mixture is methyl chloride. The second member of a mixture may be either monochlorodifluoromethane or tetrafluoroethylene. All of these compounds are readily available. A critical feature of the present process is the molar ratio of the two components of the mixture to be pyrolyzed. Where the mixture is made up of methyl chloride and tetrafluoroethylene, the molar ratio of $CF_2=CF_2/CH_3Cl$ should be about 1:1; the preferred practical range is from 0.8/1 to 1.25/1 moles of tetrafluoroethylene per mole of methyl chloride. The alternate mixture utilized according to the present invention consists of chlorodifluoromethane and methyl chloride and is operable when the molar ratio of $CHClF_2/CH_3Cl$ is within the range of greater than 1:1 to 2:1, the preferred practical range is 1.6/1 to 2.5/1 moles of chlorodifluoromethane to methyl chloride; when this molar ratio is greater than 2:1 the effect is one of uneconomical usage of material.

The process of the present invention is carried out by continuously introducing the two described components, which make up the mixture, in the vapor phase into a reactor which is inert to the starting materials. The reactor is maintained at a temperature from about 700° C. to about 950° C. The molar ratio of the components of the mixture is maintained as discussed in the previous paragraph. The reactant vapors are then converted to the desired 2,3,3,3-tetrafluoropropene by pyrolytic action, i.e., by the action of heat. A convenient form of reactor is a metal tube. However, it must be inert to the reactants. Carbon and the noble metals, particularly platinum and silver, are sufficiently inert. A preferred material of construction is a platinum-lined reactor. During the process the reactor tube may be heated by conventional methods. A preferred and convenient way is to place the tube in an electric furnace, which supplies the heat necessary to maintain the reaction temperature. The contact times which are preferred range from 0.5 to 3 seconds. Longer contact times lead to higher molecular weight products instead of the desired 2,3,3,3-tetrafluoropropene and also tend to carbonize the reactants such as methyl chloride and tetrafluoroethylene. With shorter contact times, low conversion is obtained. In determining contact times one must consider the volume of the effectively heated zone of the reactor, the volume occupied by the reactants at the time they are introduced into the reactor and the rate of feeding the reactants into the reactor. The volume of the effectively heated zone is determined by multiplying the effectively heated length times the cross-sectional area; and the volumes occupied by the reactants are calculated at 25° C. and 760 mm. (Hg) absolute pressure. The contact time will be controlled by the feed rate. After the reaction takes place, the product gases are then collected from the outlet of the reactor tube, cooled, scrubbed with water to remove the acid by-product HCl, and dried. The 2,3,3,3-tetrafluoropropene may be partially separated from the reaction mixture by distillation to yield a product useful for most chemical reactions. Highly purified samples may be obtained either by gas chromatographic separation or by bromination followed by debromination of the purified dibromide. The operable temperature limits have been found to be from about 700° C. to about 950° C. Below 700° C., the conversion is reduced to a point where the process becomes impractical. At about 950° C. and higher, degradation of the reactants and formation of less desirable products occur. The preferred range is 800° to 900° C.

The following representative examples illustrate the novel process of the present invention.

The reactor used in Examples I through IV consists of a platinum-lined metal tube 6 mm. I.D. x 24 inches heated in an 8-inch electric furnace over an effective reaction length of 5½ inches. Analysis of the product gas streams is effected by means of mass spectrometry.

EXAMPLE I

*Preparation of 2,3,3,3-tetrafluoropropene from $CHClF_2$ and $CH_3Cl$*

A mixture of 55 cc./min. of methyl chloride and 110 cc./min. of chlorodifluoromethane is passed through the apparatus described above at a temperature of 800° C. The contact time is 1.45 seconds. The gaseous products are then scrubbed free of by-product HCl and dried, yielding a product stream containing 14.8 mol percent $CF_3CF=CH_2$.

EXAMPLE II

When a mixture of 2 mols of $CHClF_2$ and 1 mol of $CH_3Cl$ at a contact time of 1.0 second is passed through the described reactor at 900° C., there is produced 13.1 mol percent of 2,3,3,3-tetrafluoropropene. At the higher temperature and shorter contact time, approximately the same yield of 2,3,3,3-tetrafluoropropene is obtained as in Example I, but the conversions of CHClF₂ and CH₃Cl are nearly quantitative.

EXAMPLE III

*Preparation of 2,3,3,3-tetrafluoropropene from tetrafluoroethylene and methyl chloride*

A mixture of 1.23 mols of CH₃Cl and 1.0 mol of CF₂=CF₂ is passed through the reactor held at 850° C. with a contact time of 1.65 seconds. After the resulting by-product acid is removed by washing with water, the dried product stream contains 13.0 mol percent of 2,3,3,3-tetrafluoropropene.

EXAMPLE IV

A mixture of 1.28 mols of CH₃Cl and 1.0 mol of CF₂=CF₂ is pyrolyzed at 850° C. and a contact time of 0.81 second in the described reactor. After treating the resulting gaseous material as described above, a product is obtained which contains 19.0 mol percent of $$CF_3CF=CH_2$$

A lower contact time of this Example IV at the same temperature results in an increased yield of 2,3,3,3-tetrafluoropropene with a lower conversion of CH₃Cl than in Example III.

EXAMPLE V

*Preparation of highly purified 2,3,3,3-tetrafluoropropene*

The reactor used consists of a platinum-lined metal tube 6 mm. I.D. x 24 inches heated by two 8-inch electric furnaces, the first one serving as a preheater. The effective reaction length is 10 inches. Over a period of 220 minutes a mixture of 304 parts (3.04 mols) of tetrafluoroethylene and 155 parts (3.07 mols) of methyl chloride is fed to the reactor. The preheater is maintained at 800° C. and the reactor at 880° C. The contact time is 2.6 seconds. The off-gases are scrubbed free of acid by a countercurrent water scrubber, dried, and condensed in a trap cooled to −78° C. This condensate, weighing 242 parts, is distilled using a ½" x 3' silvered column packed with metal packing and a head equipped with magnetic takeoff. The condenser is maintained at −75° C. and the distillation is performed at a 13/2 reflux ratio. The fractions listed below are collected.

| Fraction | B. P., ° C. | Wt. (parts) |
|---|---|---|
| I | −39.2 to −35.5 | 35.0 |
| II | −35.5 to −29.8 | 23.0 |
| III | −29.8 to −26.5 | 26.0 |
| IV | −26.5 to −22.5 | 17.0 |
| V | −22.5 to −10.0 | 12.0 |
|  |  | 113.0 |

(The loss on distillation is due to material non-condensable at −78° C.) Fractions I, II, IV and V are combined and brominated. A bromination apparatus consisting of a gas washing bottle, the inlet tube having a fritted disk, is used; the calculated amount of bromine is placed in the bottle and overlaid with a thin layer of water. The bromine portion is cooled in ice water while a heat lamp is focused on the bromine-water interface. The olefins are bubbled in at such a rate that nearly complete absorption occurs. The brominated mixture is then de-colorized with aq. NaHSO₃, washed with water, and dried over CaCl₂. Distillation of the resulting 130.5 parts of mixed bromides yields 37.4 parts of 2,3-dibromo-1,1,1,2-tetrafluoropropane, B.P. 98–105° C.

In a 250-ml. 4-necked flask is placed 77.5 parts of dioxane, 10 parts (0.15 mol) of zinc dust, and 0.1 part of zinc chloride. The flask is equipped with a stirrer, dropping funnel, thermometer, and a reflux condenser to which is connected a trap cooled in Dry Ice. When the vigorously stirred suspension has been heated to a gentle reflux, a solution of 13.7 parts (0.05 mol) of the above 2,3-dibromo-1,1,1,2-tetrafluoropropane in 15.5 parts of dioxane is added dropwise during 45 minutes in order to effect de-bromination. After the first few parts of solution has been added, a vigorous reaction ensues. The remainder of the addition goes smoothly. Stirring and heating are continued twenty minutes longer. Collected in the trap is 5.0 parts of pure liquid product (theory, 5.7 parts). The 2,3,3,3-tetrafluoropropene is identified by its infrared spectrum, C=C at 5.85 and mass spectrum, parent peak at 114, base peak at 69.

The 2,3,3,3-tetrafluoropropene obtained by the process of the present invention has been relatively unavailable to the present time because of the difficulty of preparing the compound. The present novel process therefore yields a heretofore rare but valuable monomer. This monomer may be homopolymerized. The monomer is further useful in that it may be copolymerized with other unsaturated compounds such as tetrafluoroethylene, trifluoroethylene, vinylidene fluoride, chlorotrifluoroethylene, acrylonitrile, and 1,1,2-trifluorobutadiene-1,3 to yield plastic or elastomeric polymers.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for preparing 2,3,3,3-tetrafluoropropene wherein a mixture of about 1 mol of methyl chloride and a reactant taken from the group consisting of about 1 mol of tetrafluoroethylene and about 2 moles of monochlorodifluoromethane is pyrolyzed, within a contact time range of 0.5 to 3.0 seconds, at a temperature within the range of about 700° C. to about 950° C. to form 2,3,3,3-tetrafluoropropene which is then recovered from the product stream.

2. A process for preparing 2,3,3,3-tetrafluoropropene wherein a mixture of about 1 mol of methyl chloride and a reactant taken from the group consisting of from 0.8 to 1.25 moles of tetrafluoroethylene and from 1.6 to 2.5 moles of monochlorodifluoromethane is pyrolyzed, within a contact time range of 0.5 to 3 seconds, at a temperature within the range of about 700° C. to about 950° C. to form 2,3,3,3-tetrafluoropropene which is then recovered from the product stream.

3. A process for preparing 2,3,3,3-tetrafluoropropene wherein a mixture of about 1 mol of methyl chloride and from 0.8 to 1.25 moles of tetrafluoroethylene is pyrolyzed, within a contact time range of 0.5 to 3.0 seconds, at a temperature within the range of about 700° C. to about 950° C. to form 2,3,3,3-tetrafluoropropene which is then recovered from the product stream.

4. A process for preparing 2,3,3,3-tetrafluoropropene wherein a mixture of about 1 mol of methyl chloride and from 1.6 to 2.5 moles of monochlorodifluoromethane is pyrolyzed, within a contact time range of from 0.5 to 3.0 seconds, at a temperature within the range of about 700° C. to about 950° C. to form 2,3,3,3-tetrafluoropropene which is then recovered from the product stream.

References Cited in the file of this patent

UNITED STATES PATENTS

| | | |
|---|---|---|
| 2,551,573 | Downing et al. | May 8, 1951 |
| 2,733,277 | Miller | Jan. 31, 1956 |
| 2,758,138 | Nelson | Aug. 7, 1956 |

UNITED STATES PATENT OFFICE

CERTIFICATION OF CORRECTION

Patent No. 2,931,840                          April 5, 1960

David Maley Marquis

It is hereby certified that error appears in the above numbered patent requiring correction and that the said Letters Patent should read as corrected below.

Column 1, line 67, for "1:1" read -- 1.6:1 --.

Signed and sealed this 8th day of August 1961.

(SEAL)
Attest:

ERNEST W. SWIDER                        DAVID L. LADD
Attesting Officer                         Commissioner of Patents